Feb. 23, 1932.  J. A. HARRINGTON  1,846,423
ICE CREAM DISPENSER
Filed April 1, 1931  3 Sheets-Sheet 2
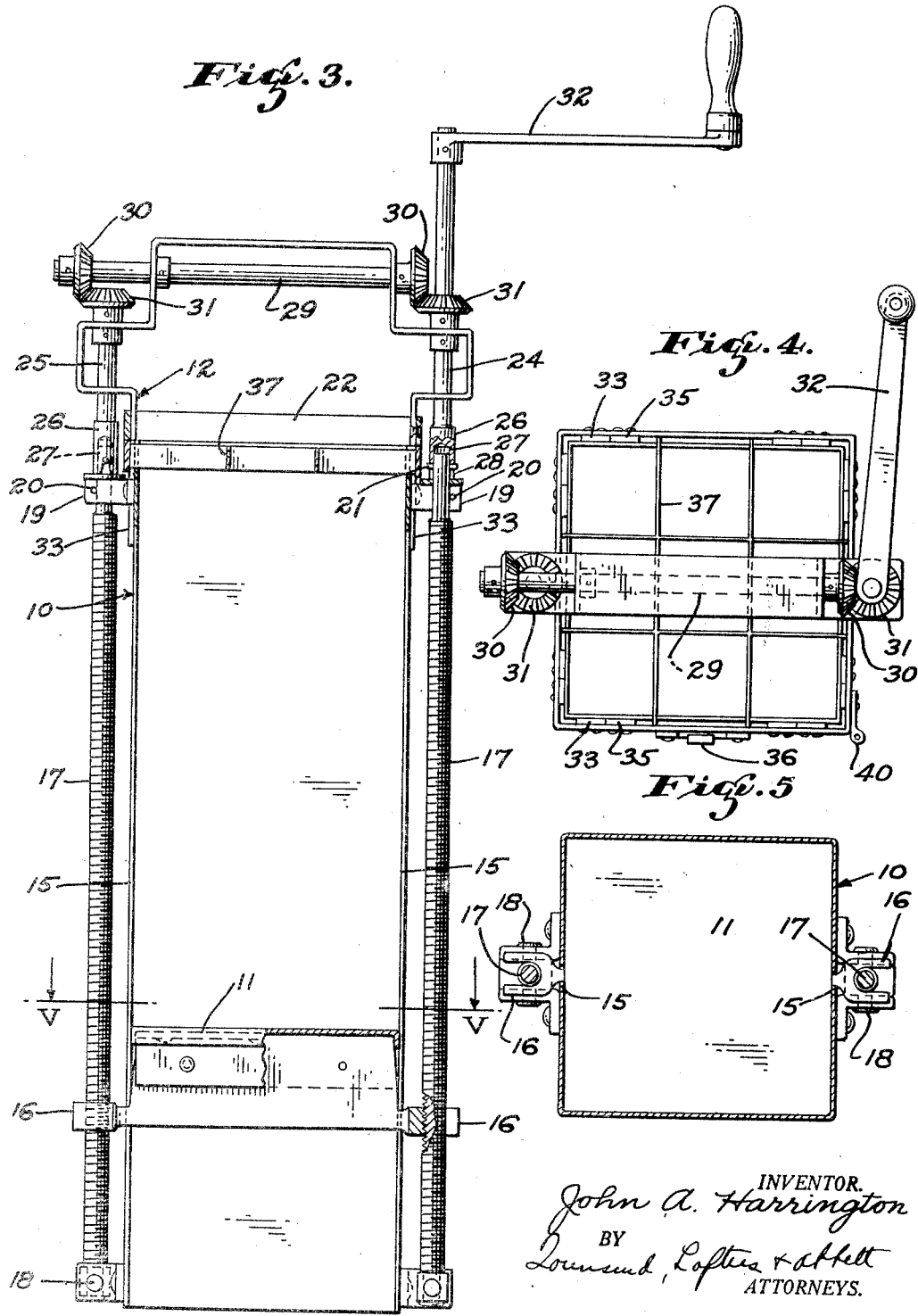

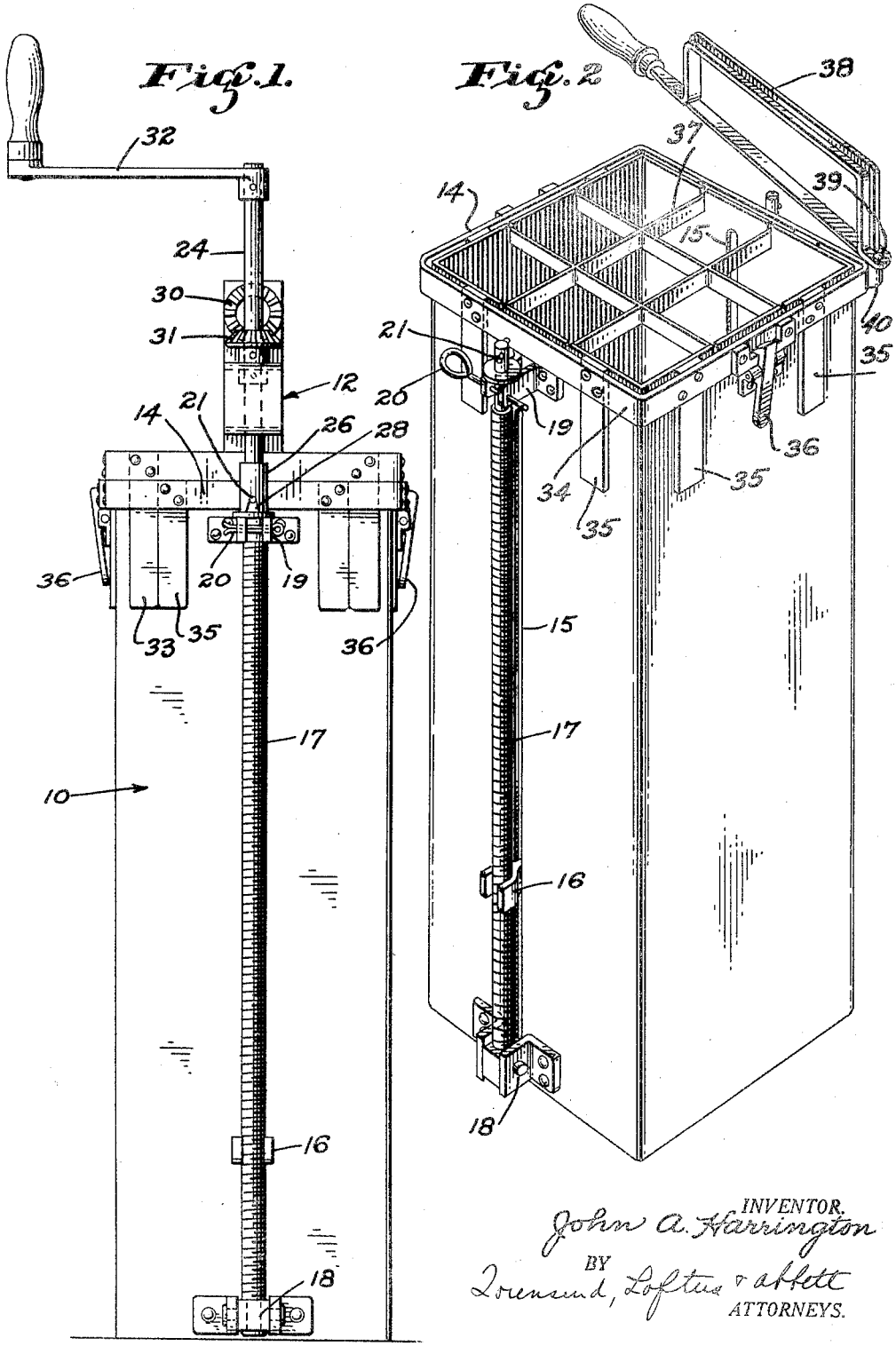

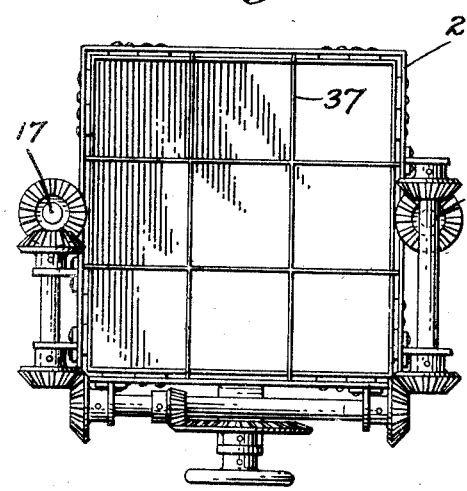
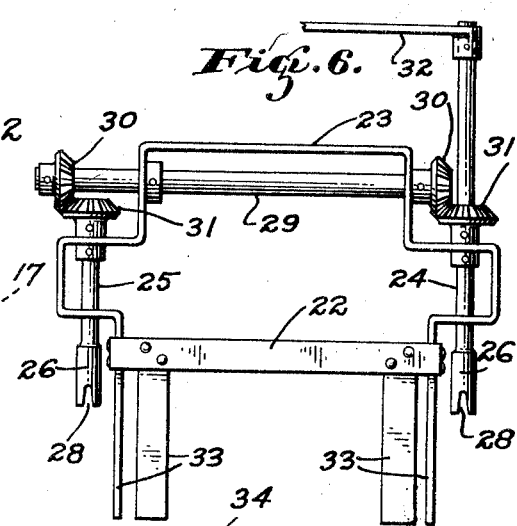
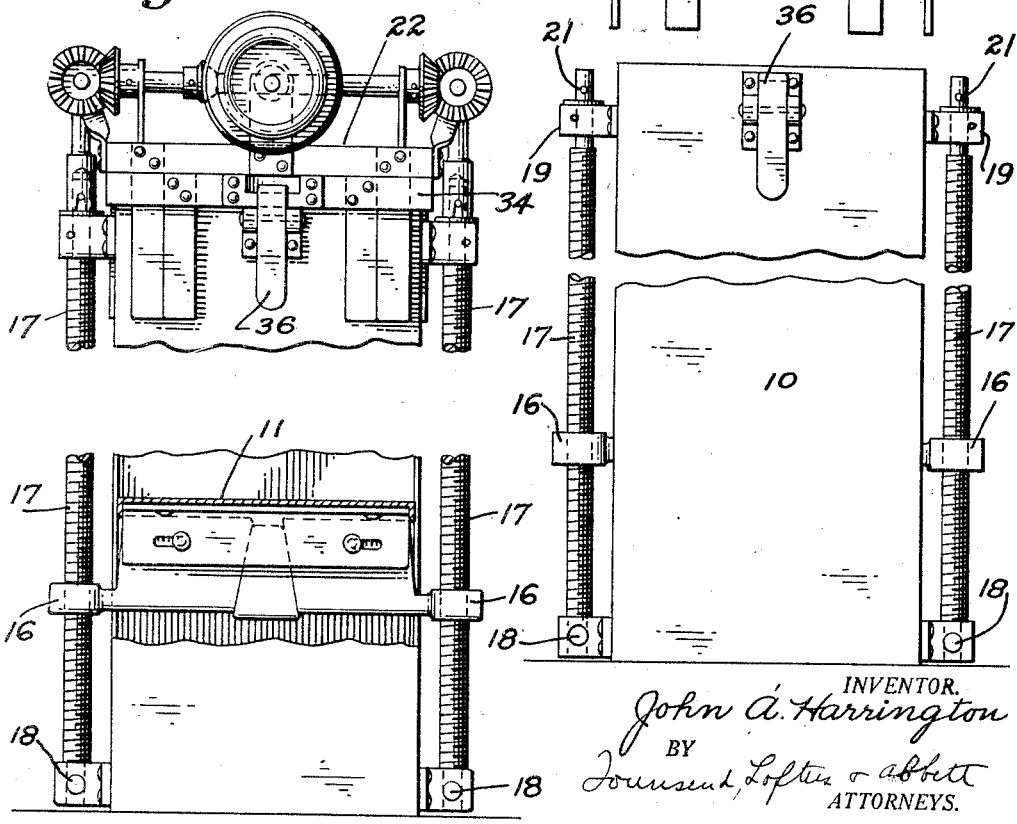

Patented Feb. 23, 1932

1,846,423

UNITED STATES PATENT OFFICE

JOHN A. HARRINGTON, OF OAKLAND, CALIFORNIA, ASSIGNOR OF ONE-HALF TO JOSEPH WOOD, OF OAKLAND, CALIFORNIA

ICE CREAM DISPENSER

Application filed April 1, 1931. Serial No. 526,815.

This invention relates to an apparatus for dispensing bulk ice cream.

In dispensing bulk ice cream by prior methods a loss results due to compressing the cream and forcing the air therefrom by the use of scoops and spoons and such loss or shrinkage runs as high as 35% by volume. Therefore, it is the principal object of the present invention to provide a simple and efficient device capable of dispensing bulk ice cream without reduction or shrinkage in volume.

In carrying the invention into practice I provide an ice cream container of standard capacity. This container is provided with a vertically reciprocable plunger which constitutes the bottom of the container. This plunger may be actuated through the medium of a removable operating head to move the ice cream in the container vertically through a cutting head removably fitted to the top of the container. This cutting head divides the ice cream vertically as it passes therethrough. A severing blade is also provided for severing the ice cream when it projects a predetermined amount above the cutting head. In this manner a predetermined number of servings of predetermined volume may be obtained from the ice cream in the container and all shrinkage due to the compressing of the ice cream by the use of scoops and spoons is eliminated.

One form which the invention may assume is exemplified in the following description and illustrated by way of example in the accompanying drawings, in which:

Fig. 1 is a side elevation of an apparatus embodying the preferred form of my invention.

Fig. 2 is a perspective view of the same with the operating head removed and showing the severing blade thereon in position to sever the ice cream projecting above the container.

Fig. 3 is a view in central vertical section through the container with the cutting and operating heads in position.

Fig. 4 is a plan view of the device as disclosed in Fig. 3.

Fig. 5 is a transverse section through the container taken on line V—V of Fig. 3.

Fig. 6 is a view in side elevation of the device showing the operating head and cutting head disassembled from the container.

Fig. 7 is a view in plan of a modified form of operating head.

Fig. 8 is a view in side elevation and partly in section showing a modified form of operating head mounted on the container.

Referring more particularly to the accompanying drawings, the apparatus disclosed comprises a container 10, a plunger 11, a plunger operating head 12 and a cutting head 14. The operating head and the cutting head are removably fitted to the upper end of the container as illustrated. The container 10 is illustrated as square in transverse cross section but it can be of any preferred configuration. At its opposite sides the container is formed with guide slots 15 which extend short of the upper end of the container. The plunger 11 is mounted within the container and conforms in configuration and dimensions with the interior of the container so that it may be vertically reciprocated therein. This plunger constitutes a closure for the lower end of the container.

In alignment with the guide slots 15 the plunger is fitted with feed nuts 16 each of which having a guide portion engaging the slots 15 and projecting therethrough. Exteriorly of the container each feed nut is formed with an inwardly projecting slot with parallel sides which terminates in a semi-cylindrical threaded portion to threadedly engage a feed screw 17, one of which is vertically arranged at each side of the container in alignment with the adjacent guide slot. The feed screws 17 are pivotally connected at their lower ends to the sides of the container by means of pivotal connections 18. This pivotal mounting of the feed screws enables them to be swung outwardly from the sides of the container and thereby be disengaged from the feed nuts so that the plunger may be rapidly returned to its lowermost position in the container. When the screws are repositioned parallel to the sides of the container as illustrated in Fig. 2 they will reengage the threaded portions of the feed nuts 16 so that upon rotation of the feed screws the plunger will be vertically moved in the container.

The upper ends of the feed screws 17 engage slotted bearings 19 fixed at the sides of the container just beyond the ends of the slots 15. Each bearing 19 is provided with a removable key 20 which when in position retains the feed screw in the bearing. When these keys 20 are removed, however, the upper ends of the feed screws may be disengaged from the bearings 19 and swung outwardly as previously described.

The upper extremity of each feed screw 17 is reduced somewhat in diameter and provided with a transversely extending and projecting clutch pin 21. The purpose of these clutch pins is to enable the feed screws 17 to be operatively engaged with an operating head for the purpose of revolving the feed screws in a direction enabling the plunger to be moved vertically in the container.

The operating head, as illustrated most clearly in Fig. 6, comprises a rectangular frame 22 of sufficient dimension to embrace the upper end of the container. This rectangular frame 22 is formed with an overlying frame 23. This overlying frame carrier two vertical shafts 24 and 25, one disposed at each side of the frame so that when the frame is mounted on the container they will align with the feed screws 17. The shafts 24 and 25 are collared in position. The lower end of each shaft 24 and 25 is fitted with a clutch collar 26 formed with an upwardly extending bore 27 adapted to receive the upper end of the adjacent feed screw 17. The lower end of each collar 26 is slotted as at 28 to engage the transverse clutch pin 21 of the feed screw with which it is engaged. Therefore, when the operating head is in position the clutch collars 26 of the shafts 24 and 25 will be operatively connected with the feed screws 17 so that upon rotation of the shafts 24 and 25 the feed screws will be rotated.

In order to rotate the shafts 24 and 25 a horizontal shaft 29 is provided and carried by the overlying frame 23. This shaft is fitted with a pair of bevel gears 30 which engage bevel gears 31 on the shafts 24 and 25. The shaft 24 is provided with a crank handle 32 by which it may be rotated. It is obvious from Fig. 3 that when the shaft 24 is rotated that the feed screws 17 will be rotated in unison and in the proper drection to move the plunger 11 vertically in the container.

In order to support the frame 22 in proper position on the end of the container, it is provided with a plurality of guide fingers 33 which depend downwardly to engage the exterior surface of the container. It is obvious that the operating head is removably mounted on the upper end of the container so that it can be expeditiously positioned on the container or removed therefrom.

As previously stated, it is intended that the plunger 11 be moved upwardly in the container after the same has been filled with ice cream so as to force the ice cream through a cutting head at the upper end of the container and thereby divide the cream longitudinally. The cutting head comprises an open rectangular frame 34 of dimensions slightly greater than the exterior dimensions of the container. This frame is provided with downwardly depending guide fingers 35 which engage the outer surface of the container to support the cutting head in position. It will be noticed that the guide fingers 35 are positioned intermediate the frame 34 and the outer surface of the container so as to space the inner surface of the frame from the outer surface of the container. In this manner the guide fingers 33 of the operating head may be inserted between the frame 34 and the container so that the operating head may be mounted on the container or removed therefrom without disturbing the cutting head.

The cutting head is latched in position by means of latch mechanisms 36 arranged one at each side of the container. These latch mechanisms include complementary latch parts on the container and on the frame 34 as illustrated. When these latch mechanisms 36 are disengaged the cutting head may be removed from the container.

Secured at their ends to the frame 34 are transverse cutting blades 37, two blades extending between opposite sides of the frame and intersecting as illustrated so as to divide the area of the frame into nine squares of equal area. In order to accommodate these blades, the upper edge of the container is slotted at proper intervals as illustrated most clearly in Fig. 2. It is obvious from the drawings that when the feed screws 17 are operated to elevate the plunger 11 that the ice cream in the container will be forced upwardly through the cutting head and will be divided by the blades 27 as previously described.

After the ice cream projects a predetermined distance above the upper edge of the container, it is severed transversely at the upper edge of the container. This is accomplished by means of a severing blade 38. At one end this blade has a downwardly projecting pintle 39 adapted to removably engage a socket 40 at one corner of the frame 34 enabling the severing blade 38 to pass through an arc at a plane at the top of the container to sever the ice cream transversely, thus completing the dividing of the projecting portion of the ice cream into nine individual servings.

In operation of the device both the cutting head and operating head are removed from the container and the keys 20 are removed and the feed screws 17 moved outwardly so as to lower the plunger 11 to its lowermost position in the container. The feed screws are then repositioned and maintained in such position by reinsertion of the keys 20. The container is then filled with the ice cream.

If it is desired to serve the ice cream, the cutting head is applied to the upper end of the container as previously described and latched in position by the latches 36. The operating head 12 is then applied and the crank handle 32 manipulated to operate the feed screws 17 and elevate the plunger 11 a predetermined height. This may be determined by the number of revolutions made with the crank or it may be determined in any other desired manner.

The operating head is then removed and the pintle 39 of the severing blade 38 is then engaged with the socket 40 and the severing blade actuated to sever the projecting portion of the ice cream transversely. As the projecting portion of the ice cream has already been divided longitudinally by the blades 37, upon the operation of the blade 38 the projecting portion of the cream will be divided into a plurality of servings of equal volume.

These operations are repeated until all of the ice cream in the container has been dispensed.

In actual practice I find that by the use of my apparatus that negligible shrinkage in volume of the ice cream results. This is quite an improvement in comparison with prior methods of dispensing ice cream wherein the shrinkage in volume through serving by scoops or spoons amounts to as high as 35% by volume.

It is manifest, therefore, that I have provided an improved apparatus for dispensing ice cream.

In Figs. 7 and 8 I have shown a slightly modified form of operating head. The operating head in these two figures is such that the crank handle and gears are disposed at the sides of the operating head rather than overlying it as illustrated in the previous figures. This operating head shown in the modified form, however, fits the container in the same manner as that previously described and operates in substantially the same manner with the exception that there is a little different arrangement of gears in order to accommodate the crank handle at the side of the device.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An apparatus of the character described comprising a container, a plunger forming a closure for one end thereof, the other end of the container being open, means for moving the plunger longitudinally of the container to cause the ice cream therein to emerge from the open end of the container, cutting means at the open end of the container to divide the ice cream longitudinally as it emerges through the open end of the container, and an operating head removably fitted to the open end of the container and operatively associated with the plunger to operate the same.

2. An apparatus of the character described comprising an elongated container for containing ice cream in frozen condition, a plunger reciprocably mounted in the container and forming a closure for one end thereof, a cutting head removably fitted to the open end of the container, an operating head removably fitted to the open end of the container and adapted to operatively connect with the plunger to advance the same toward the open end of the container whereby it will cause the ice cream to emerge from the open end of the container, and cutting blades carried by the cutting head for dividing the ice cream longitudinally as it is forced through the open end of the container.

3. An apparatus of the character described comprising a container adapted to contain ice cream, a plunger reciprocably mounted in the container, feed nuts connected with the plunger and arranged at the exterior of the container, screw shafts arranged vertically at the exterior of the container and engageable with said feed nuts whereby rotation of the screw shafts will advance the plunger toward the open end of the container, an operating head removably fitted to the upper end of the container and engaging said screw shafts to operate the same in unison, and cutting means at the open end of the container to divide the ice cream as it emerges from the open end of the container.

4. An apparatus of the character described comprising a container, a plunger reciprocably mounted in the container and forming a closure for one end thereof, said container being formed with guide slots in its opposite sides, projections on the plunger projecting through said slots, feed nuts at the outer ends of said projections, screw shafts pivotally connected at their lower ends to the container and threadedly engaging said feed nuts, the upper ends of said screw shafts being normally latched in position but capable of being unlatched and swung about their pivot points to disengage the shafts from the feed nuts, cutting means at the open end of the container for dividing the ice cream as it is advanced through the open end of the container by the plunger, and an operating head adapted to be removably mounted on the open end of the container and detachably engage the screw shafts for revolving the same in unison and advancing said plunger toward the open end of the container.

5. An apparatus of the character described comprising a container, a plunger reciprocably mounted in the container and forming a closure for one end thereof, said container being formed with guide slots in its opposite sides, projections on the plunger projecting through said slots, feed nuts at the outer ends of said projections, screw shafts pivotally connected at their lower ends to the container and threadedly engaging said feed nuts, the upper ends of said screw shafts being normally latched in position but capable of being unlatched and swung about their pivot points to disengage the shafts from the feed nuts, cutting means at the open end of the container for dividing the ice cream as it is advanced through the open end of the container by the plunger, and an operating head adapted to be removably mounted on the open end of the container and detachably engage the screw shafts for revolving the same in unison and advancing said plunger toward the open end of the container, said cutting means comprising a cutting head removably fitted to the open end of the container and including transverse blades for longitudinally dividing the ice cream as it advances through the open end of the container.

6. An apparatus of the character described comprising a container, a plunger in said container forming a closure for one end thereof, the other end of the container being open, a cutting head removably fitted to the open end of the container, latch means for latching said cutting head in position, an operating head adapted to be removably mounted on the open end of the container and operatively engaged with the plunger to advance the same toward the open end of the container and thereby advance the ice cream in the container through the cutting head, said cutting head having transverse blades for dividing the ice cream longitudinally as it is advanced through the open end of the container by the plunger.

JOHN A. HARRINGTON.